2,790,788
LINEAR POLYAMIDE POLYMERS OF 4-AMINO-CYCLOHEXYL-ACETIC ACID

Jonas Kamlet, Easton, Conn., assignor to National Distillers Products Corporation, New York, N. Y., a corporation of Virginia No Drawing. Application December 23, 1952, Serial No. 327,690

3 Claims. (Cl. 260—78)

This invention relates to linear polyamide polymers and, more particularly, to a process for the manufacture of linear polymers containing polyamide linkages, characterized by high softening and melting points and exceptional thermal stability.

In Swiss Patent 276,924 (1951), Inventa A.-G. fuer Forschung und Patentverwertung have described a linear polyamide polymer of unit structure

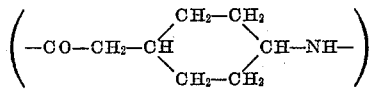

which is stable at temperatures up to 400° C. and only commences to decompose between 450° C. and 500° C. This high degree of thermal stability is unique among linear polyamide polymers, most of which soften and melt at temperatures well under 270° C. In addition this polymer is considerably more stable to oxidation and has better moisture retention characteristics than poly-caprolactam (nylon 6) or poly-hexamethylenediamine adipate (nylon 66), to polyamide polymers most widely used at the present time.

The only process for the manufacture of this high melting polymer described to the present time involves the polymerization of endoethylene-caprolactam of structure:

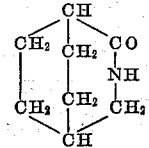

at temperatures between 180° C. and 300° C. The only method at present available for the manufacture of endoethylene-caprolactam is based on the following sequence of reactions, described by Komppa, Berichte 68, 1267–1272 (1935) and in the above mentioned Swiss Patent 276,924:

(a) Homoterephthalic acid is prepared by one of two alternate methods:

(1) Para-toluidine is converted by a Sandmeyer reaction to para-toluinitrile. The latter is chlorinated to para-cyanobenzylchloride. The latter is reacted with an alkali metal cyanide to yield para-cyanobenzonitrile, which is then hydrolyzed with acid to homoterephthalic acid. (Mellinghoff, Berichte 22, 3208 (1889); Fileti and Baldracco, Journ. prakt. Chem. (2) 47, 532 (1891).)

(2) Para-cymene is chlorinated and para-isopropylbenzyl chloride is recovered in poor yield. The latter is reacted with an alkali metal cyanide, to yield para-isopropylbenzyl cyanide, which is oxidized and hydrolyzed with nitric acid to a mixture of homoterephthalic acid and terephthalic acid. These two acids may be separated by fractional crystallization (Rossi, Ann. Supl. 1, 139 (1861); Fileti and Basso, Gazz. Chim. Ital. 2II, 61 (1891).)

(b) Homoterephthalic acid is converted to its dimethyl ester and is then hydrogenated by the method of Skita in the presence of a reduced platinum catalyst to yield hexahydrohomoterephthalic acid.

(c) The hexahydrohomoterephthalic acid is converted to the magnesium salt and the latter is dry distilled in a stream of carbon dioxide gas, to give a 50%–60% of theory yield of bicyclo (2.2.2) octanone-2.

(d) The bicyclo (2.2.2) octanone-2 is reacted with hydroxylamine in the usual manner to obtain the bicyclo (2.2.2) octanone-2-oxime, which is then submitted to a Beckmann rearrangement with concentrated sulfuric acid to yield the desired endoethylene-caprolactam.

The reactions involved may be described by the following equations:

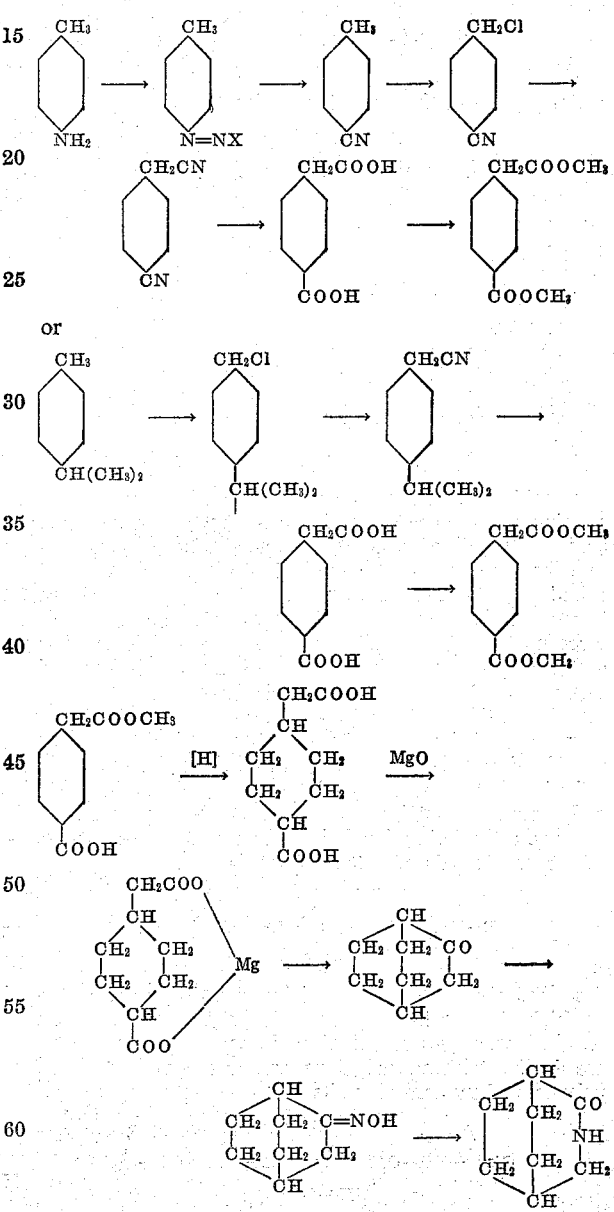

It is one of the purposes of this invention to provide a simpler and less expensive process for the manufacture of similar high-melting linear polyamide polymers and related derivatives thereof.

I have found that linear polyamide polymers of high softening and melting points and good thermal stability can be obtained by heating at a temperature between 150° C. and 400° C., for a sufficient period of time to effect polymerization, at atmospheric, subatmospheric or superatmospheric pressures, at least one member of the group of compounds of general formula

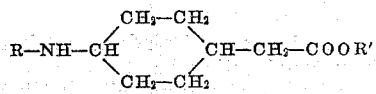

where R is chosen from the group consisting of hydrogen and R'COO substituents, R' is chosen from the group consisting of hydrogen, aliphatic, aromatic, cycloaliphatic, heterocyclic, ammonium and quaternary ammonium substituents. The reaction involved may be represented by the equation:

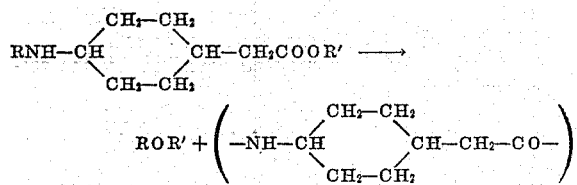

Compounds of the general formula:

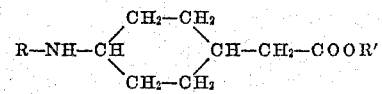

exist in both cis- and trans- stereoisomeric forms, and these isomers may be separated by the methods described by Ferber and Leonhardt (Berichte, 67, 245–249 (1934)) and by Ferber and Bendix (Berichte 72, 839–848 (1939)). As synthesized by all methods heretofore utilized, a mixture of the cis- and trans- isomers is obtained. By polymerizing said mixture of cis- and trans- isomers by the method described above, a linear polyamide polymer is obtained which is believed to be similar to the polymer described in Swiss Patent 276,924 (1951) in chemical structure and physical properties but somewhat different from said polymer in stereoisomeric configuration. Thus, a mixture of 77.5% of cis-para-aminocyclohexylacetic acid and 22.5% of trans-para-aminocyclohexylacetic acid may be obtained by the method of Ferber and Bendix (cited supra). On polymerization, this mixture yields a linear polyamide polymer which does not melt at temperatures up to 400° C. and has physical properties similar to the polymer of Swiss Patent 276,924, but is believed to have a different stereoisomeric structure. It is believed that the configuration of the monomer units in the polymer of Swiss Patent 276,924 is exclusively the trans modification, whereas the configuration of the monomer units in my polymers is a mixture of the cis modification and the trans modification in undetermined proportions.

Thus, on isolating the cis isomers and the trans isomers of the compounds of general formula

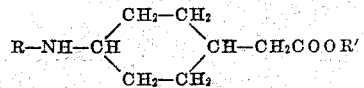

described above, and polymerizing each isomer separately, high melting linear polyamide polymers of different physical properties are obtained in each case. Thus, we are dealing with at least three groups of polymers, i. e., polymers of monomeric units

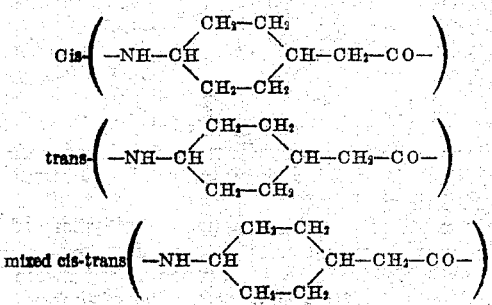

Starting with pure cis- and pure trans- isomers, some racemization and rearrangement occurs during polymerization, so that a mixture of cis- and trans- isomers is obtained in each case. However, the composition of this mixture varies with the nature of the starting material. Thus, the actual proportion of cis- and trans- isomer in the polymer is different when the unseparated mixture of isomers, or the pure cis- or trans- isomer of

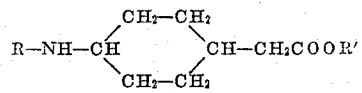

is used as a starting material.

Preferred methods for the preparation of some of the monomers suitable in this invention will be given herewith, but it is understood that this invention is in no way limited to the specific methods described herewith. Other methods, procedures and modifications will occur to any person skilled in the art.

Benzyl cyanide is nitrated at a low temperature (by the method described by Ferber in Berichte 62, 187 (1929)) and the resultant isomer mixture is recrystallized from alcohol to give para-nitrobenzyl cyanide in 60–72% of theory yield. This compound is simultaneously saponified and esterified with alcoholic hydrochloric acid to give ethyl para-nitrophenyl-acetate in 91% of theory yield. This ester may be reduced to ethyl para-aminophenylacetate and then hydrogenated in a separate step to ethyl 4-aminocyclohexylacetate. However, it is much more convenient to combine the reduction and the ring hydrogenation in a single step. Thus, the ethyl para-nitrophenylacetate may be converted in good yield to ethyl 4-aminocyclohexylacetate by hydrogenation in the presence of a reduced platinum catalyst at 60° C., under 2.5 atm. pressure for seven hours, by the well known procedure of Skita (Berichte 45, 3388 (1912)); ibid 52, 1519 (1919). This hydrogenation is described in detail by Ferber and Leonhardt (cited supra).

In a similar manner phenylacetic acid may be nitrated by the method of Ferber (Berichte 62, 187 (1929)) and the mixture of isomers of nitrophenylacetic acid separated by esterification with ethanolic hydrochloric acid, and recrystallization of the ethyl esters from hot alcohol. Ethyl para-nitrophenylacetate is recovered in a yield of 82% of theory, and may be further converted as described above.

Similarly, para-nitrotoluene may be chlorinated or brominated at advanced temperatures (125°–190° C.) to yield the corresponding para-nitrobenzyl halides. The latter are reacted with an inorganic salt of hydrocyanic acid, to yield para-nitrobenzyl cyanide, which may be hydrolyzed to paranitrophenylacetic acid or simultaneously hydrolyzed and saponified to ethyl para-nitrophenylacetate (Wachendorff, Annalen 185, 266–285 (1877)).

In an industrial operation, it will be found desirable to employ a relatively inexpensive catalyst in place of the reduced platinum catalyst described above.

I have found that aqueous solutions of the alkali metal salts of paranitrophenylacetic acid can be hydrogenated to the corresponding salts of 4-aminocyclohexylacetic acid in yields of 90% or better at temperatures between 150° and 250° C., hydrogen pressures of 50 to 200 atmospheres and in the presence of Raney nickel, promoted Raney nickel, Raney cobalt, reduced nickel formate or nickel precipitated on infusorial earth or similar carriers, as catalysts.

Compounds suitable for use as monomers to prepare the polymers of this invention are:

(a) mixed cis-trans 4-aminocyclohexylacetic acid, cis-4-aminocyclohexylacetic acid (M. Pt. 289.5° C.), trans-4-aminocyclohexylacetic acid (M. Pt. 308°–310° C.), their ammonium salts, quaternary ammonium salts, alkylammonium salts, arylammonium salts, heterocyclic ammonium salts, etc.

(b) mixed cis-trans ethyl 4-aminocyclohexylacetate, cis-ethyl 4-aminocyclohexylacetate, trans-ethyl-4-aminocyclohexylacetate as well as other alkyl, aryl, cycloaliphatic and heterocyclic esters, etc.

(c) mixed cis-trans 4-acetylaminocyclohexylacetic acid, cis-4-acetylaminocyclohexylacetic acid (M. Pt. 185°–187° C.), trans 4-acetylaminocyclohexylacetic acid (M. Pt. 235° C.), as well as other alkanoyl and aroylaminocyclohexylacetic acids.

(d) mixed cis-trans ethyl 4-acetylaminocyclohexylacetate, cis-ethyl 4-acetylaminocyclohexylacetate (M. Pt. 60°–62° C.), trans-ethyl 4-acetylaminocyclohexylacetate (M. Pt. 115°–116° C.), mixed cis-trans ethyl 4-benzoylaminocyclohexylacetate, trans-ethyl 4-benzoylaminocyclohexylacetate (M. Pt. 142° C.), cis-ethyl 4-benzoylaminocyclohexylacetate and similar alkyl, aryl, cycloaliphatic and heterocyclic esters of 4-substituted aminocyclohexylacetic acid.

The synthesis of these compounds and resolution into the individual isomers is described in the papers of Ferber, Leonhardt and Bendix (cited supra).

The polymerization of these monomers is effected by heating at temperatures between 150° C. and 400° C. for two to fifteen hours. This reaction may be carried out in the presence of water or a similar chain-stopper or viscosity stabilizer (Coffman, Berchet, Peterson and Spanagel, Journ. Polymer Science, 2, #3, 306–313 (1947)), at atmospheric subatmospheric or superatmospheric pressure, according to the well known procedure of the art.

Thus, mixed cis-trans 4-aminocyclohexylacetic acid (100 parts by weight) and water (20 parts by weight) are heated in an autoclave, under a nitrogen atmosphere, for ten hours at a temperature of about 275° C. On cooling, the pressure in the autoclave is released and high melting polymer may be recovered by filtration. A similar polymer may be prepared by heating mixed cis-trans ethyl 4-aminocyclohexylacetate at atmospheric pressure and a temperature of 250°–275° C. for four hours, and then at 260°–270° C. for six hours under a vacuum of 14 mm. Hg. The polymerization of the cis-isomers and of the trans-isomers are effected in an identical manner.

Because of their high melting points, the linear polyamide polymers of this invention cannot be spun from a melt, as are the linear polyamide polymers now known to the art. However, these high-melting polymers are soluble in dimethyl formamide, formamide, phenols, cresols, xylenols and other polyamide solvents. Thus, they may be spun, extruded, cast or poured into filaments, fibers, sheets, tubes, bristles, films, etc. from solutions in these and other solvents.

One of the most valuable uses of the polymer-forming monomers of this invention is in the modification of the melting points, water retention and other physical and chemical properties of other linear polyamide polymers. Thus, the monomers described above may be copolymerized with a monomer containing the structural unit

where $x$ is an integer from 4 to 17. Typical monomers of this type are epsilon-caprolactam, 6-aminocaproic acid, ethyl 6-aminocaproate, N-formyl-6-aminocaproic acid, 7-aminoheptanoic acid, cyclooctanone, isoxime, ethyl 9-aminononanoate, 10-aminocapric acid, 11-aminoundecanoic acid, 17-aminoheptadecanoic acid, ethyl 17-aminoheptadecanoate. The resultant two component linear polyamide polymers may contain from 1% to 99% of units of structural formula:

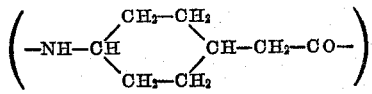

the remainder consisting of units of structural formula:

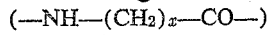

where $x$ is an integer from 4 to 17.

Similarly, the monomers of this invention may be copolymerized with a monomer containing the structural unit:

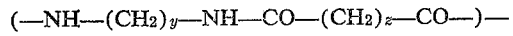

where $y$ and $z$ are integers from 4 to 16. Typical monomers of this type are the salts of one of the following group of difunctional amines:

(a) tetramethylene diamine, pentamethylene diamine, hexamethylene diamine, heptamethylene diamine, octamethylene diamine, nonamethylene diamine, decamethylene diamine, undecamethylene diamine and dodecamethylenediamine, with one of the following group of dibasic acids:

(b) adipic, pimelic, suberic, azelaic, sebacic, undecandioic-1,11, brassylic, tetradecandioic-1,14, octadecandioic-1, 18, terephthalic, homoterephthalic. The resultant two-component linear polyamide polymers may contain from 1% to 99% of units of structural formula:

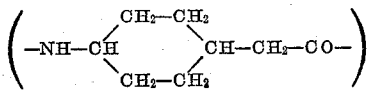

the remainder consisting of units of structural formula:

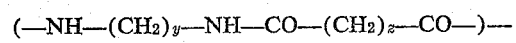

where $y$ and $z$ are integers from 4 to 16.

Similarly, multi-component linear polyamide polymers may be synthesized containing 1% to 99% of the monomer unit of this invention, as described above, the remainder consisting of a mixture of two or more other types of linear polyamide monomer units, such as those described above. Multiple ingredient linear polyamide polymers are well known in the art, and have been described by Catlin, Czerwin and Wiley in the Journal of Polymer Science 2, #4, pp. 412–419 (1947.)

Having described my invention what I claim and desire to protect by Letters Patent is:

1. A process which comprises heating a monomer selected from the group consisting of the mixed stereoisomers of cis-trans-4-aminocyclohexyl acetic acid and the ethyl esters thereof at a temperature of 150–400° C. and below the melting point of the resulting polymer to obtain a polymer not melting below 400° C.

2. A process, as described in claim 1, in which the monomer is cis-trans-4-aminocyclohexyl acetic acid.

3. A process, as described in claim 1, in which the monomer is ethyl 4-aminocyclohexylacetate.

References Cited in the file of this patent

UNITED STATES PATENTS

| | | |
|---|---|---|
| 2,071,253 | Carothers | Feb. 16, 1937 |
| 2,241,321 | Schlack | May 6, 1941 |
| 2,252,555 | Carothers | Aug. 12, 1941 |

FOREIGN PATENTS

| | | |
|---|---|---|
| 276,924 | Switzerland | Nov. 1, 1951 |

OTHER REFERENCES

Ferber et al.: Berichte Deut. Chem. Gesel. vol. 72 B, pages 839–48, 1939, abstracted in Chem. Abstract vol. 33, pages 5370–1, 1939. (Copy in Scientific Library.)